May 19, 1925.
T. EWAN
TREATMENT OF ALKALI METAL AMALGAMS, ESPECIALLY FOR THE
PRODUCTION OF ALKALI METALS
Filed March 31, 1924
1,538,390
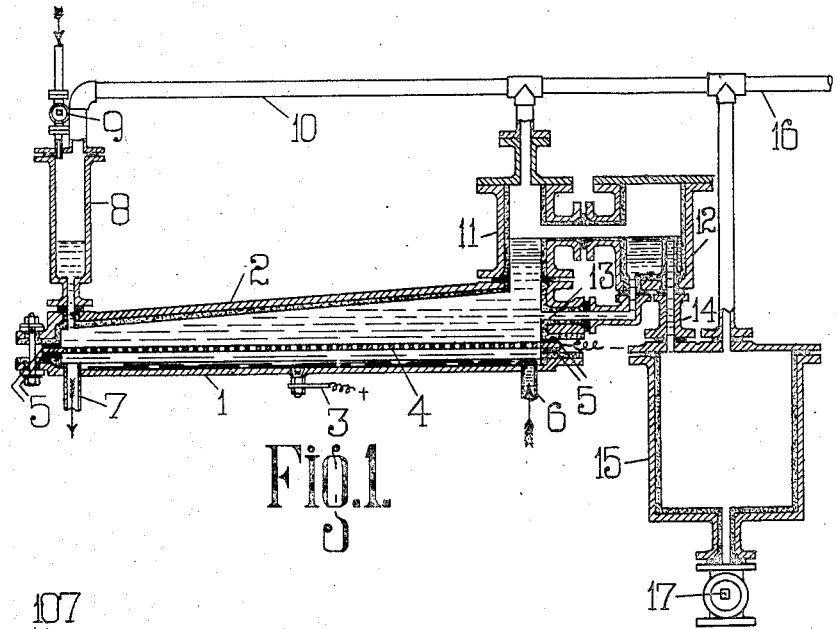
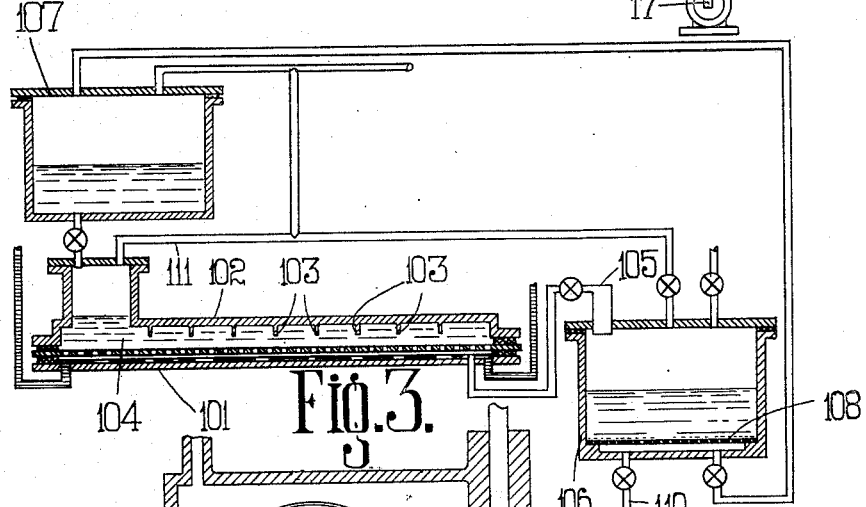
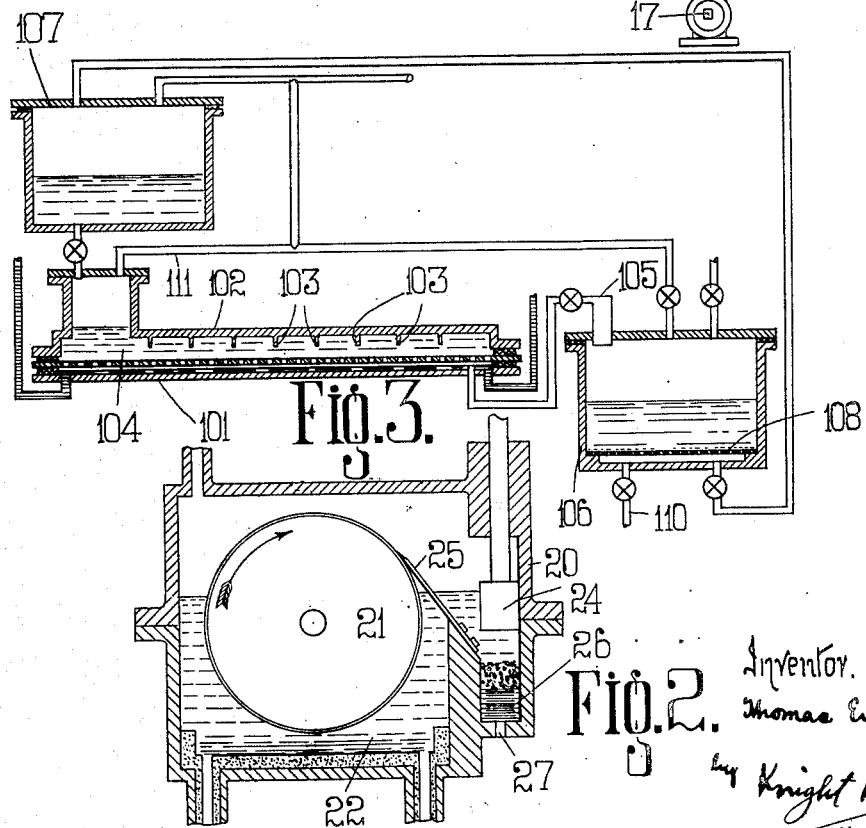

Patented May 19, 1925.

1,538,390

UNITED STATES PATENT OFFICE.

THOMAS EWAN, OF GLASGOW, SCOTLAND.

TREATMENT OF ALKALI-METAL AMALGAMS, ESPECIALLY FOR THE PRODUCTION OF ALKALI METALS.

Application filed March 31, 1924. Serial No. 703,103.

*To all whom it may concern:*

Be it known that I, THOMAS EWAN, a subject of the King of Great Britain, residing in Glasgow, in the county of Lanark, Scotland, have invented certain new and useful Improvements in and Relating to the Treatment of Alkali-Metal Amalgams, Especially for the Production of Alkali Metals, of which the following is a specification.

This invention relates to an improvement in the treatment of alkali metal amalgams. It is easy to make such amalgams by electrolysis of aqueous solutions of alkali metal salts but the amalgams are very dilute and hitherto it has been difficult to isolate useful products therefrom.

One object of the invention is to provide an improved method of removing an alkali metal from an amalgam thereof. A further object is to provide methods of recovering useful products by the electrolytic treatment of alkali metal amalgams. Other objects of the invention will be apparent from the description hereafter. The scope of the invention is defined in the appended claims.

I find that it is possible to isolate sodium (or other alkali metal) from amalgam especially from a very dilute amalgam by using the amalgam as anode in the electrolysis of an inert electrolytic solution at low temperatures i. e. at temperatures much lower than 100° C. The preferred range is from —30° C. to +30° C. which is far below those which can be obtained by the use of fused salts. The solvent I prefer to use is liquid anhydrous ammonia but the invention is not limited thereto as other solvents may be used provided that they yield electrolytic solutions inert to sodium or other alkali metal, that is, the solutions must not react with the sodium or alkali metal to an extent which will prevent isolation of the metal therefrom. Liquid methylamine is an example of an alternative solvent. Pyridine or butyl alcohol may be used as solvents for lithium chloride but not for the other alkali metals. Many organic liquids are excluded because they react with sodium or alkali metal. Salts in the fused condition are unsuitable because their melting points are too high. The term volatile liquid or solvent excludes such fused salts.

The electrolyte may be any sodium (or alkali-metal) salt which is soluble in the solvent and which is inert (in the above-defined sense) to sodium (or other alkali metal) for example, sodium (or other alkali metal) cyanide.

Among the useful products obtainable according to the invention I may mention alkali metals, solutions of alkali metals in liquid anhydrous ammonia, or reaction-products such as alkali metal amides.

The metals can thus be separated as solids direct, but solutions in the liquid solvent may be drawn off continuously to yield the metals by evaporation. The whole process of isolation of the metals may be made continuous.

The invention also includes a suitable apparatus as defined in the claims.

My experiments lead to the conclusion that solutions of alkali metal salts in liquid anhydrous ammonia may be divided into three groups:—

(1) Those in which the corresponding metal dissolves the solution may or may not consist of two phases.

(2) Those in which the metal is insoluble or very sparingly soluble and with which it co-exists in the form of a solution of the metal in ammonia free or nearly free from salts.

(3) Those in which the metal is substantially insoluble and with which it co-exists in the solid form.

When a readily soluble sodium salt for example, is added in increasing quantities to a solution of sodium in ammonia a point can be reached at which the solution separates into two distinct layers, the lower one consisting of a solution of the sodium salt in ammonia containing mere traces of free sodium and the upper one containing substantially the whole of the sodium dissolved in ammonia and almost free from the salt. Further increase of the concentration of the salt increases the concentration of the sodium solution in equilibrium with it until saturation is reached; beyond this point solid sodium separates out.

Solutions belonging to the first group (those in which the metal dissolves more or less readily) are of little value in the manufacture of the metals by my invention because the metal which is formed at the cathode dissolves more or less readily in the electrolyte and is reabsorbed therefrom by the mercury at the anode. Further any metal which escapes reabsorption can only be removed from the cell together with the dissolved salt from which it must be separated in a subsequent operation, a very undesirable complication of the process. The more nearly the solutions approach the border line which divides them from group two, the less do these objections hold good. When using dilute solutions I prefer to use a diaphragm to hinder contact of dissolved sodium with mercury.

The solutions of the second group (those from which alkali metal separates almost completely in the form of a solution in ammonia) are very suitable electrolytes for the purpose of this invention. The metal solutions float on the surface of the salt solutions and are thereby effectively kept out of contact with the anode amalgam. Being liquid, they are readily removed from the electrolytic cell, and the metal is easily recovered in a pure condition by evaporating off the ammonia.

Solutions of the third group are also suitable although the deposition of solid metal, with its tendency to form dentritic crystalline growths, and the removal of the solid metal from a cell, which on account of the volatile nature of the solution is necessarily closed gastight, presents difficulties which are not met with when the metal is produced in the form of a liquid solution.

I have further discovered that the alkali metal is rapidly transformed to its amide by interaction with the ammonia in presence of the dissolved salt if a suitable solid catalyst is present. High-carbon steel is such a catalyst. Hence catalytic metal surfaces must be present or absent according to whether it is desired to obtain alkali metal amides or the metals themselves.

The number of sodium or alkali metal salts which yield suitable electrolytic solutions is limited. The majority are either insoluble or so sparingly soluble in ammonia that only solutions of the first group are obtainable. Sodium chloride and bromide, for example, yield solutions of this first group only.

Other salts which are sufficiently soluble cannot be used because they are not inert, i. e. they react with sodium or other alkali metal, the nitrates and thio cyanates being examples.

Sodium cyanide and sodium iodide are sufficiently soluble to yield solutions of groups two and three. They do not react with sodium in presence of liquid ammonia and the solutions are good conductors of electricity but I prefer the cyanide since there is a danger of forming explosive products in certain cases when using the iodide.

The alkali metal amalgam may be of any strength but the very dilute, liquid amalgams which are easily obtained are preferred. In using these the current density at the anode must be proportioned to the alkali metal content of the amalgam and to its rate of movement; if too high current density is employed mercury dissolves as well as alkali metal and the production of the latter is diminished. So far my experiments have indicated that (with sodium amalgam for example) an anodic current density of 3 or 4 amperes per square centimetre for each 1 per cent of sodium in a stationary amalgam is safe but very much higher current densities can be employed, if the amalgam is stirred or flows in a thin sheet if these critical current densities are surpassed mercury dissolves, when the production of sodium may stop. The current density at the cathode may be quite small as compared with processes in which fused salts are electrolyzed.

The cathode is suitably made of wrought iron or mild steel, but many other materials which conduct electricity and are not acted on by the substances present in the cell are available, e. g. Monel metal is suitable. Cast iron, platinum and mercury, for example, are unsuitable or undesirable for various reasons. Metals such as high-carbon steel, which accelerate the normally very slow reaction between alkali metals and ammonia to form amide should be avoided if it is desired to isolate the alkali metals. Metals such as lead which form alloys with alkali metal should be avoided when the object is to obtain alkali metals or amides and I use the term " a cathode which remains substantially unaltered " as excluding a lead cathode, though it includes cathodes of metals such as high-carbon steel which can be employed if it is desired to obtain the metal amides.

The portions of the containing vessel which come into contact with alkali metal solutions should be made of a material which does not catalyze the reaction forming the metal amide. Thus if a solution of alkali metal in ammonia in presence of a solution of a salt is allowed to come in contact with steel, the reaction forming metal amide may be so catalyzed as to yield amide almost entirely.

The invention will be described more fully with reference to the following examples to which the invention is not limited.

Figures 1, 2 and 3 of the accompanying drawings show suitable forms of apparatus in diagrammatic vertical section.

*Example 1.*

Potassium.

A solution of potassium iodide in liquid anhydrous ammonia, containing not less than 0.6 gram (preferably 0.7 gram) of potassium iodide per cubic centimetre of solution, is electrolyzed with a copper cathode and a potassium amalgam anode (0.05%). The solution is at or slightly below its boiling point at atmospheric pressure. Potassium is removed from the amalgam and forms at the cathode a bronze coloured solution of potassium in ammonia. This bronze liquid rises from the cathode to the surface of the iodide solution where it accumulates, and is easily drawn off continuously and without admixture of iodide solution, by means of a suitable separator which is kept at a temperature below that at which the solution boils.

The impoverished amalgam is withdrawn from the cell and replaced by fresh amalgam. The flow may be intermittent or continuous. If the amalgam drawn off contains 0.01% of potassium the current density at the anode may be 0.03 amp. per sq. cm. The potassium solution may be evaporated at atmospheric pressure, which minimizes the loss by reaction with ammonia to potassamide. The residual metal is somewhat spongy; it is fused at as low a temperature as possible and run off into moulds in a pure state.

The part of the electrolytic cell in which the potassium solution collects and also the evaporator should be made of or lined with material which does not accelerate the reaction between potassium and ammonia. Ebonite, glass, enamelled iron and copper may be mentioned as examples of suitable materials.

If a solution of iodide considerably more dilute than that specified is used, no potassium is obtained, but only potassamide.

In Fig. 1. of the drawing the electrolyte is contained in a cast iron vessel 1, the upper part of which is protected by an ebonite lining 2. Current is supplied at 3 so that the amalgam is the anode and a perforated steel plate 4 serves as the cathode; this is insulated at 5. The amalgam flows in at 6 and out at 7. Liquid anhydrous ammonia is supplied through valve 9 to container 8. Ammonia gas passes along pipe 10 and may be drawn off at 16. The upper liquid layer of potassium solution collects in vessel 11 overflowing into vessel 12 from which it is withdrawn through pipe 14, vessel 15 and valve 17. The iodide solution overflowing with the potassium solution is returned through pipe 13. The apparatus may be under pressure if desired. The cooling jackets (necessary especially for vessel 12) are not illustrated.

The process of obtaining solutions of alkali metals as described in this example is included within the scope of this invention but it is specifically claimed in my co-pending application Serial No. 703102, filed March 31, 1924.

*Example 2.*

Solid sodium.

A solution of 90 to 100 grams sodium cyanide in 100 grams of liquid ammonia is electrolyzed at atmospheric pressure and at temperatures between its boiling and freezing points (approximately between —20° C. and —34° C.) with a mild steel cathode and a sodium amalgam (0.05%) anode. Sodium is deposited in the form of a solid crystalline sponge which is collected together by any suitable means within the cell, such as a knife and piston and without exposure to air, or moisture, and then compressed in order to expel the enclosed electrolyte and cause the separate crystals to coalesce into a mass of homogeneous metal. This metal is then extruded by pressure through an orifice in the cell wall which is always closed by the plug of solid sodium. The current efficiency in this case is almost theoretical.

The process may be performed in the apparatus very diagrammatically shown in Fig. 2 of the drawing.

In this drawing, 20 is a vessel (cooled by a jacket not shown) 21, is a slowly rotating cathode drum, 22 is the amalgam, 24 a reciprocating piston, 25 the knife and 26 the solid sodium extruded through outlet 27.

*Example 3.*

Sodamide.

Figure 3 of the drawings represents diagrammatically a suitable apparatus.

An electrolytic cell 101 is used, similar to that described in Figure 1, and working in the same way with the exceptions described below. The electrolyte is a solution of 50 parts by weight of sodium cyanide in 100 parts by weight of liquid anhydrous ammonia. The amalgam contains 0.05% of sodium. The collecting and separating vessels are omitted. The cathode is constructed of an active catalyst e. g. high-carbon steel and the ebonite lining is omitted, thus exposing the sodium solution to the catalytic action of the metal of the containing vessel 102 (e. g. steel). Additional catalytic surfaces 103 may be arranged near the surface of the electrolyte 104 so that they are in contact both with sodium solution and with electrolyte. A pipe 105 is provided through which the electrolyte overflows into filter 106 without effecting the level of the electrolyte in cell 101. The sodium produced is rapidly converted into sodium amide which is almost insoluble in the sodium cyanide solution and therefore crystallizes out as a white mud. The suspended mud is continuously swept out of the cell by feeding in fresh sodium cyanide solution from the reservoir 107. When filter 106 is filled the flow is diverted to a duplicate filter (not shown). The liquid is expelled (by raising the pressure in 106 in any convenient way) through filter plate 108 (which may be of fine wire gauze) into receiver 107. The cake of sodamide is then washed free from adhering salt solution by admitting liquid ammonia through valve 109. The washings are transferred to vessel 107. If the quantity of ammonia used in washing exceeds that consumed in the formation of the amide and carried away with the hydrogen at 111 the excess must be removed by evaporation. The washed amide is finally heated a little above its melting point (about 150° C.) and run off through valve 110 into moulds.

The process of obtaining alkali metal amides as described in this example is included within this invention but it is claimed specifically in my co-pending application Serial No. 703,104, filed March 31, 1924.

In the following claims I use the term inert to signify that neither the solvent nor the dissolved salt react with the alkali metal (in absence of catalysts) to a sufficient extent under working conditions to prevent the commercially satisfactory isolation of the metal. I use the term volatile to limit the term "solvent" by exclusion of fused salts. Obviously the word solvent implies that the liquid in question is capable of dissolving an inert salt to the required extent.

I claim as my invention:—

1. The process of treating alkali metal amalgam which comprises causing a very dilute amalgam to flow through a cell, electrolyzing a solution of an inert alkali metal salt in an inert liquid at a temperature much below 100° C. in contact with said amalgam as anode so as to remove alkali metal therefrom and isolating a useful product.

2. The process of treating alkali metal amalgam which comprises causing a very dilute amalgam to flow through a cell, electrolyzing a solution of an inert alkali metal salt in liquid anhydrous ammonia in contact with said amalgam as anode so as to remove alkali metal therefrom and isolating a useful product.

3. The process of treating alkali metal amalgam which comprises electrolyzing a solution of an inert salt in an inert volatile liquid in contact with the amalgam as anode and a cathode which remains substantially unaltered so as to remove alkali metal from the amalgam.

4. The process of treating alkali metal amalgam which comprises electrolyzing a solution of an inert salt of the alkali metal in an inert liquid at a temperature much below 100° C. in contact with the amalgam as anode and a cathode which remains substantially unaltered so as to remove alkali metal from the amalgam.

5. The process of treating alkali metal amalgam which comprises electrolyzing a solution of inert alkali metal salt in liquid anhydrous ammonia in contact with the amalgam as anode and a cathode which remains substantially unaltered so as to remove alkali metal from the amalgam.

6. The process of treating alkali metal amalgam which comprises electrolyzing a solution of alkali metal cyanide in liquid anhydrous ammonia in contact with the amalgam as anode and a cathode which remains substantially unaltered so as to remove alkali metal from the amalgam.

7. The process of treating sodium amalgam which comprises electrolyzing a solution of sodium cyanide in liquid anhydrous ammonia in contact with the amalgam as anode and a cathode which remains substantially unaltered, so as to remove sodium from the amalgam.

8. The process which comprises preparing a dilute alkali metal amalgam by electrolyzing an aqueous solution of an alkali metal salt with a mercury cathode and then electrolyzing a solution of an inert alkali metal salt in an inert volatile solvent at a temperature much below 100° C. in presence of the said amalgam as anode.

9. The process which comprises preparing a dilute alkali metal amalgam by electrolyzing an aqueous solution of an alkali metal salt with a mercury cathode and then electrolyzing a solution of an inert alkali metal salt in liquid anhydrous ammonia in presence of the said amalgam as anode.

10. The process which comprises preparing a dilute sodium amalgam by electrolyzing an aqueous solution of a sodium salt with a mercury cathode and then electrolyzing a solution of sodium cyanide in liquid anhydrous ammonia in presence of the said amalgam as anode.

11. The process of removing alkali metal from an amalgam thereof which consists in electrolyzing a solution of alkali metal cyanide in an inert solvent in contact with an anode of alkali metal amalgam.

12. The method of obtaining an alkali metal which comprises electrolyzing a solution of an inert salt of the alkali metal in an inert volatile solvent in contact with an amalgam of the alkali metal as anode at a temperature much lower than 100° C. and then isolating the alkali metal thus removed from the amalgam.

13. The method of obtaining an alkali metal from an amalgam thereof which comprises electrolyzing a concentrated solution of an inert salt of the alkali metal in an inert solvent at a temperature much lower than 100° C. in contact with an amalgam anode and producing solid alkali metal.

14. The method of obtaining an alkali metal from an amalgam thereof which comprises electrolyzing a concentrated solution of an inert salt of the alkali metal in liquid anhydrous ammonia in contact with an amalgam anode and producing solid alkali metal.

15. The method of obtaining sodium from an amalgam thereof which comprises electrolyzing a concentrated solution of an inert sodium salt in liquid anhydrous ammonia in contact with a sodium amalgam anode and producing solid sodium.

16. The method of obtaining sodium from an amalgam thereof which comprises electrolyzing a concentrated solution of sodium cyanide in liquid anhydrous ammonia in contact with a sodium amalgam anode and producing solid sodium.

17. The method of obtaining an alkali metal from a very dilute amalgam thereof which comprises electrolyzing a concentrated solution of an inert salt of the alkali metal in an inert solvent at a temperature much below 100° C. in contact with an amalgam anode and producing solid alkali metal.

18. The process of obtaining alkali metal which comprises preparing a dilute alkali metal amalgam by electrolyzing an aqueous solution of an alkali metal salt with a mercury cathode, and then electrolyzing a solution of an inert salt of the alkali metal in an inert solvent at a temperature much below 100° C. in presence of the amalgam as anode and isolating solid alkali metal.

19. The process of obtaining sodium which comprises preparing a dilute sodium amalgam by electrolyzing an aqueous solution of a sodium salt with a mercury cathode, and then electrolyzing a solution of an inert sodium salt in liquid anhydrous ammonia in presence of the amalgam as anode and isolating solid sodium.

20. The process of removing an alkali metal from a very dilute amalgam which comprises electrolyzing a concentrated solution of an inert alkali metal salt in an inert volatile solvent in contact with said very dilute amalgam as anode.

21. Apparatus for the manufacture of alkali metals comprising a cell adapted to contain liquid anhydrous ammonia and having surfaces which do not catalyze the reaction between alkali metal and liquid anhydrous ammonia, means to allow dilute alkali metal amalgam to flow therethrough as anode, a cathode, electrical connections for said anode and cathode, and means to isolate alkali metal.

In witness whereof, I have hereunto signed my name this 13 day of March, 1924, in the presence of two subscribing witnesses.

THOMAS EWAN.

Witnesses:
GEORGE E. CHAMBERLIN,
DAVID C. H. KENNED,